B. T. BARTON & W. M. NOLIN.
AUTOMOBILE JACK.
APPLICATION FILED SEPT. 6, 1916.
1,216,923.
Patented Feb. 20, 1917.
2 SHEETS—SHEET 2.
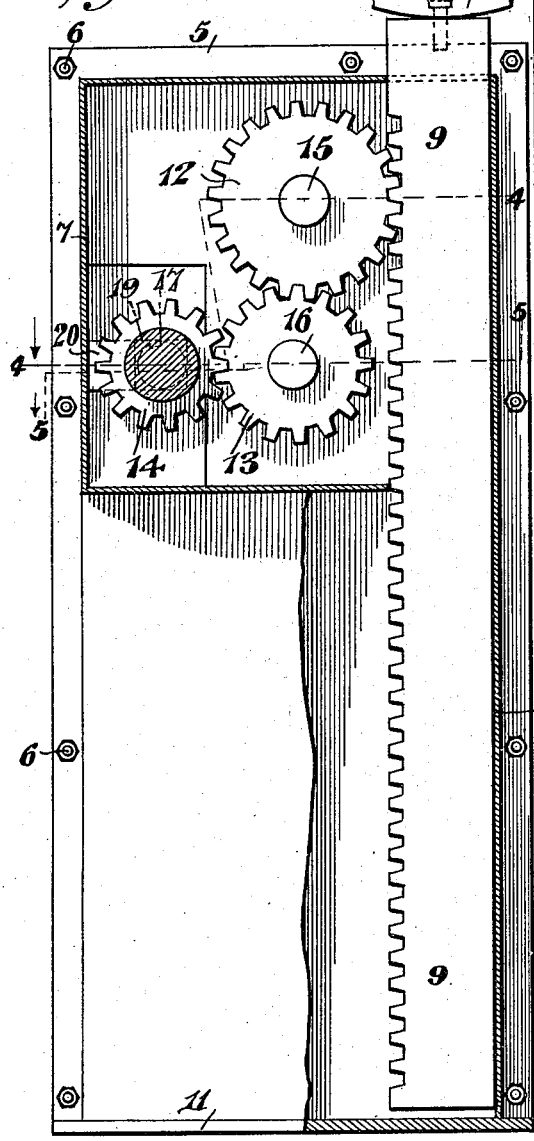
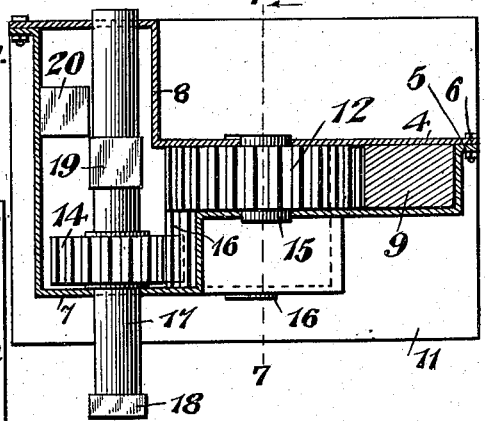
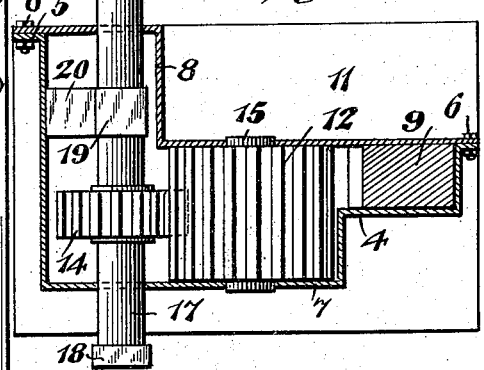
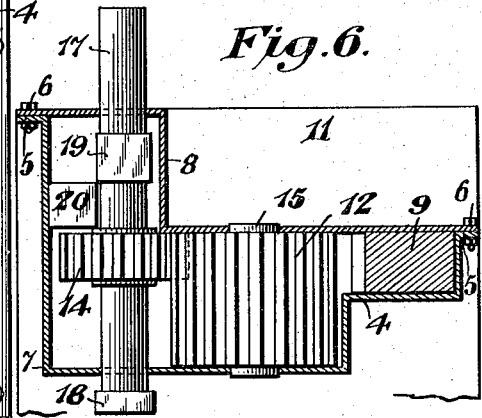
WITNESSES
Jas. K. McCathran
H. T. Chapman
INVENTORS
Bradford T. Barton
William M. Nolin
BY
E. G. Siggers
ATTORNEY

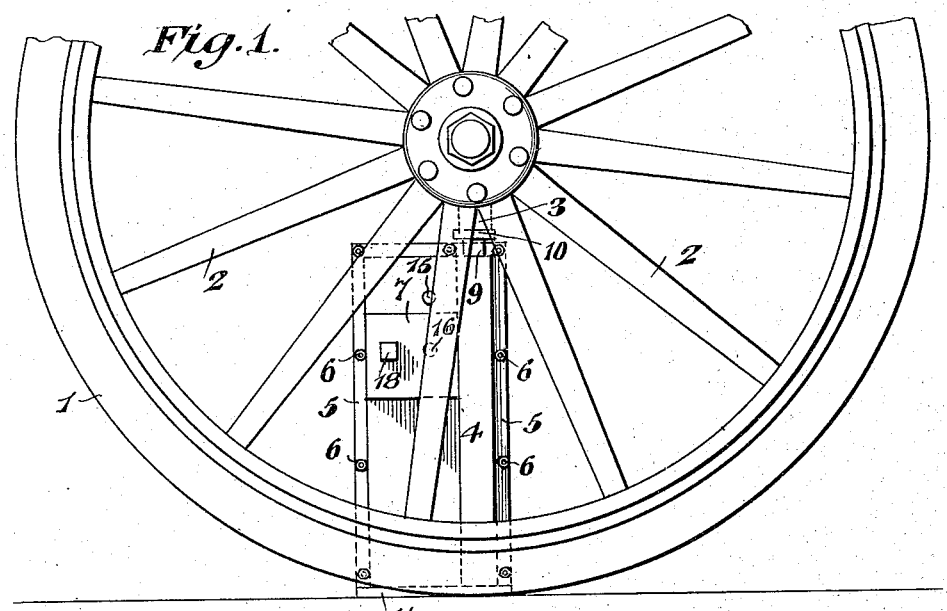

UNITED STATES PATENT OFFICE.

BRADFORD T. BARTON AND WILLIAM M. NOLIN, OF COLORADO SPRINGS, COLORADO.

AUTOMOBILE-JACK.

1,216,923.  Specification of Letters Patent.  Patented Feb. 20, 1917.

Application filed September 6, 1916.  Serial No. 118,756.

*To all whom it may concern:*

Be it known that we, BRADFORD T. BARTON and WILLIAM M. NOLIN, citizens of the United States, residing at Colorado Springs, in the county of El Paso and State of Colorado, have invented a new and useful Automobile-Jack, of which the following is a specification.

This invention has reference to automobile jacks, and its object is to provide a lifting jack especially adapted for automobiles, although useful in other connections, which may be actuated from one side of the automobile through one of the wheels to lift the vehicle to the desired extent and there positively lock, but in a manner permitting the ready unlocking of the jack and lowering of the vehicle at any time desired.

In accordance with the invention the jack is provided with the usual rack bar, which may be raised or lowered to correspondingly move the vehicle, the rack being supported in a suitable casing or frame work, while gearing is in engagement with the rack and may be actuated by means of a suitable tool provided for the purpose and introducible through the space between two adjacent spokes of a wheel behind which the jack may be placed when in use. The actuating tool is made in the form of a socket wrench with an actuating crank and adapted to engage one end of a drive shaft so constructed and so movable with relation to the gearing and to a lock member in the jack that the rack bar may be elevated to any desired extent continuously and then positively locked in the elevated position against movement in either direction and without the aid of pawls or other such moving lock members.

The invention will be best understood from a consideration of the following detailed description, taken in connection with the accompanying drawings forming part of this specification, with the further understanding that while the drawings show a practical form of the invention, the latter is not confined to strict conformity with the showing of the drawings, but may be changed and modified so long as such changes and modifications come within the scope of the appended claims.

In the drawings:

Figure 1 is a side of an automobile wheel, showing the jack in position back of the wheel.

Fig. 2 is an edge elevation of the automobile wheel, with the jack in place, and also showing the operating tool in dotted lines.

Fig. 3 is a vertical cross section of the jack on a larger scale than in Fig. 1, and showing some parts in elevation.

Fig. 4 is a section on the line 4—4 of Fig. 3.

Fig. 5 is a section on the line 5—5 of Fig. 3, but showing the parts in a different position than in Fig. 4.

Fig. 6 is a section similar to that of Fig. 5, but showing the parts in still another position.

Fig. 7 is a section on the line 7—7 of Fig. 4.

Referring to the drawings, there is shown an automobile wheel 1 having spokes 2, and mounted on an axle 3. These parts may be taken as indicative of any of the well known makes of automobiles or in fact of any make of automobile for which the jack is adapted.

The jack comprises a front plate 4, and a back plate 5, in the particular arrangement shown in the drawings, but it will be understood that these two plates, which are joined by bolts or screws 6, represent the main frame or body of the jack and are susceptible of many changes so long as the body of the jack serves the purpose for which it is intended. One of the plates, say the plate 4 is formed with an offset 7, and the other plate 5 is formed with an offset 8, which constitutes a boxing or housing for certain parts to be described. The jack casing is of sufficient length to substantially house a rack bar 9 capable of moving into and out of the casing through the top thereof and at the top the rack bar 9 is provided with a swivel head 10, such as is frequently used in automobile jacks. The body of the jack is formed with a foot 11, which may be sufficiently extensive to constitute a base of ample area.

Housed within the offset 7 and extending partly into the body of the casing is a series of gear wheels 12, 13, 14 meshing in the order named with the gear wheel 12 meshing with the teeth of the rack bar 9. The gear wheel 12 has trunnions 15 mounted in the main part of the casing of the jack, while the gear wheel 13 is axially elongated and has trunnions 16 journaled in the body of the jack and in one wall of the offset 8. The gear wheel 14 is in mesh with the gear wheel 13 and is capable of moving along the gear wheel 13 in a path parallel with the axis of the gear wheel 13. The gear wheel 14 is mounted upon and fixed to an elongated shaft 17 mounted for rotation in appropriate walls of the offsets 7 and 8, and exterior to the offset 7 the shaft 17 is formed with a non-circular and preferably square head 18. On the shaft 17 on the side of the gear wheel 14 remote from the head 18 is a non-circular and preferably square portion 19. On the inner wall of the offset 8 is a block or projection 20 across which the projection 19 may be caused to travel when the shaft 17 is moved lengthwise.

The length of the shaft 17 and its mounting in the casing is such that it may be moved from a position where the gear wheel 14 is in mesh with the gear wheel 13 near one end thereof, to a position where the gear wheel 14 is in mesh with the other end of the gear wheel 13. The extent of travel of the shaft 17 in the direction of its length is sufficient to move the block 19 from a position to one side of the block 20 across the latter to a position at the other side thereof, so that in the first and last positions of the block 19 it is free from engagement with the block 20, but in the intermediate positions, the two blocks engage, and being of non-circular conformation, they serve as an interlocking means preventing the shaft 17 from being turned in either direction.

In the collapsed position of the jack the shaft 17 is usually withdrawn at its head end projecting from the casing 7 as far as the gear wheel 14 will permit and in this position, the block 19 is free from engagement with the block 20. Now the jack may be placed behind a wheel with the head 10 in underriding position with respect to the axle 3 and then a socket wrench, indicated in dotted lines at 21 in Fig. 2, is introduced through two adjacent spokes of the wheel into engagement with the head 18. By turning the socket wrench in the appropriate direction, which may be counter clockwise as viewed in Fig. 3, motion is imparted to the gear wheel 14 and by the latter to the gear wheel 13, which serves as an idler to the gear wheel 12 and the latter acting upon the rack 9 elevates it until the head 10 engages and lifts the axle 3 and with it the wheel 1. When the axle 3 has been elevated as far as desired, endwise pressure upon the socket tool 21 causes a corresponding movement of the shaft 17 lengthwise of the latter until the block 19 is opposite the block 20 and these blocks being of square cross section with the block 20 fast to the casing, lock the shaft 17 against rotation in either direction, so that the vehicle axle is positively held in the elevated position against any possibility of dropping. When it is desired to lower the axle, the tool 21 is again applied to the head 18 and on slightly turning the tool to ease the engagement of the blocks 19 and 20, the shank 17 is further propelled longitudinally until the block 19 has passed beyond the block 20 and the gear wheel 14 has reached the other end of the gear wheel 13, whereupon a reverse movement of the tool 21 permits the gradual lowering of the vehicle and housing of the rack bar 9 until the wheel 1 again rests upon the ground or other support. The jack is of simple construction and may be made largely of pressed metal readily joined together or dismantled. By the use of suitable dies or molds, the parts may be made in large quantities and may be readily fitted together without machining, although, of course, a better fit is obtained if the gear teeth be cut. However, for the usual automobile purposes, the whole jack is susceptible of very cheap manufacture while amply strong and capable of withstanding the rough usage to which such an instrument is subjected.

The shaft 17 serves both as an actuating device and as a lock bolt, being capable of rotation about its longitudinal axis and of movement lengthwise of said axis, while the block 20 fixed to the casing of the jack serves as a keeper for the lock bolt.

What is claimed is:—

1. An automobile jack comprising a rack bar for engaging and lifting the automobile, gearing for moving the rack bar, and an actuating lock bolt engaging the gearing and rotatable for actuating the gearing, said lock bolt being movable in the direction of its length and together with the jack having coacting means for locking the lock bolt on longitudinal movement of the latter.

2. An automobile jack provided with reciprocable and rotatable jack mechanism, and actuating means for the rotatable mechanism comprising a rotatably and longitudinally movable lock bolt constantly connected to the rotatable mechanism, and a fixed keeper on the jack in coactive relation to a part of the lock bolt for holding the latter against rotation in one position and permitting rotation of the lock bolt in other positions of the latter.

3. An automobile jack comprising a suitable casing, a rack bar movable therein, gearing for driving the rack bar and including an elongated gear wheel and another gear wheel meshing therewith and movable longitudinally of the first-named gear wheel, a shaft carrying the second-named gear wheel and movable longitudinally to cause movements of the gear wheel with it, and coacting locking devices on the shaft and on the casing and movable into and out of locking relation by longitudinal movements of the shaft.

4. A lifting jack for automobiles and other purposes comprising a suitable casing, a rack bar constituting the lifting member of the jack, a train of gearing engaging the rack bar and including an elongated gear wheel and another gear wheel movable lengthwise of the first-named gear wheel, a longitudinally movable shaft carrying the second-named gear wheel for rotating it and moving it bodily lengthwise of the first-named gear wheel, said shaft having a non-circular part, and a non-circular member fast to the casing of the jack in the path of a non-circular member on the shaft for mutual engagement and disengagement on the lengthwise movement of the shaft.

5. A lifting jack for automobiles and other purposes comprising a suitable casing, a rack bar constituting the lifting member of the jack, a train of gearing engaging the rack bar and including an elongated gear wheel and another gear wheel movable lengthwise of the first-named gear wheel, a longitudinally movable shaft carrying the second-named gear wheel for rotating it and moving it bodily lengthwise of the first-named gear wheel, said shaft having a non-circular part, and a non-circular member fast to the casing of the jack in the path of a non-circular member on the shaft for mutual engagement and disengagement on the lengthwise movement of the shaft, said shaft also having an end exposed outside of the casing for the application of a manipulating tool.

6. A jack for automobiles and the like provided with a lifting member, propelling means for the lifting member, actuating means for the propelling means having a direction of movement other than that actuating the propelling means, and means on a fixed portion of the jack in coactive relation to the actuating means with the latter having means associated with the means on the fixed part of the jack for locking the actuating means to the fixed member by a movement of the actuating means other than that operating the propelling means.

In testimony that we claim the foregoing as our own, we have hereto affixed our signatures.

BRADFORD T. BARTON.
WILLIAM M. NOLIN.

Copies of this patent may be obtained for five cents each, by addressing the "Commissioner of Patents, Washington, D. C."